United States Patent [19] [11] 4,296,796
Wulf [45] Oct. 27, 1981

[54] HEAT TRANSFER SYSTEM
[75] Inventor: Helmut Wulf, Ostfildern, Fed. Rep. of Germany
[73] Assignee: Daimler-Benz Aktiengesellschaft, Stuttgart, Fed. Rep. of Germany
[21] Appl. No.: 70,505
[22] Filed: Aug. 28, 1979
[30] Foreign Application Priority Data
Sep. 21, 1978 [DE] Fed. Rep. of Germany ....... 2841051
[51] Int. Cl.³ ............................................ F28D 15/00
[52] U.S. Cl. ........................................ 165/46; 165/76; 165/41; 165/104.26; 29/157.3 R; 285/245
[58] Field of Search ........... 165/105, 76, 46, DIG. 24; 29/157.3 R; 285/245

[56] References Cited
U.S. PATENT DOCUMENTS
1,089,650  3/1914  Kile ................................. 285/245 X
2,835,480  5/1958  Perez ............................... 165/105
3,604,503  9/1971  Feldman, Jr. et al. ......... 165/105 X
3,640,090  2/1972  Ares ................................ 165/105 X
4,050,509  9/1977  Bienert et al. ................. 165/105 X Primary Examiner—Albert W. Davis
Attorney, Agent, or Firm—Craig and Antonelli

[57] ABSTRACT
A heat transfer system disposed between a heat-emitting zone or heat source and a heat-consuming zone or heat sink in accordance with the heat pipe principle. A vacuum-tight hose conduit is arranged between the heat-emitting zone and the heat-consuming zone at least along a partial region of a heat transfer path. The respective ends of the vacuum-tight hose conduit are threadedly connected in the heat transfer path with the vacuum-tight hose conduit being resistant to the heat transfer medium and being provided with an internal capillary structure for enabling a return of the condensate.

6 Claims, 5 Drawing Figures

HEAT TRANSFER SYSTEM

The present invention relates to a heat transfer system for transferring heat between a heat source and a heat sink in accordance with the principles of a heat pipe. A number of heat pipes have been proposed with such heat pipes being constructed as an evacuated hermetically-tight sealed hollow space made of a material of high heat conductivity such as, for example, copper or aluminum, with the heat pipe preferably having the shape of a pipe or plate. Generally, a fraction of the hollow space of the heat pipe is filled with a vaporizable and condensible heat transfer medium with the selection of the heat transfer medium being dependent upon the temperature level at which heat is to be transferred.

Additionally, the heat pipe may be provided, on an inside thereof, at least partially with a capillary structure for returning the condensed heat transfer medium from the heat-emitting point to the heat-absorbing point. Such heat transfer may be accomplished by, for example, lining of the pipe with a mesh screen or by imparting to the inner pipe surface a grooved structure.

In proposed heat pipes, suitable filling media are, for present purposes, for example, ammonia, water, or a mixture of alcohol and water. The thus-introduced medium into the heat pipe evaporates at the hot spot of the heat pipe where the thermal energy is supplied and rapidly expands in the interior of the heat pipe. At heat-emitting zones of the heat pipe, the evaporated medium is precipitated and condenses giving off its heat to the wall of the heat pipe. Due to the capillary effect, the condensate creeps back from the heat-emitting zone to the heat-supply zones of the heat pipe. The amount of heat transferred to the wall of the heat pipe by the medium on the condensate side is removed on the outside by radiation, convection, or by thermal conduction.

Since a phase change of the heat transfer medium occurs at the heat-absorbing and/or heat-emitting zone of the heat pipe, it is essentially the transformation energy required for the phase change which is transferred in heat form. Since the transformation energies, based on the mass of the heat transfer medium, are substantially larger than the amounts of energy which can be stored by the heating of a medium, it is possible, by transporting relatively small amounts of heat transfer medium, to transfer a large amount of heat even over rather large distances. Additionally, by imposing a certain pressure on the interior of the heat pipe, it is also possible to ensure that the heat transfer takes place only up to a quite specific temperature.

Occasionally, it is required that heat transfer take place between a heat source and a heat sink which are movable relative to each other. For example, when applying the heat transfer principle such as described hereinabove to motor vehicle technology, such relative motions may be caused by, for example, driving shocks or by engine vibrations. However, when heat exchangers are accommodated in vehicle doors, there is a problem with providing a heat transfer system which can participate in the pivotal motion of the vehicle door. Although it would be possible, when using a hot water circulation system, to bridge zones of relative displacement by arranging a pair of hose conduits for supplying and removing the circulating hot water, this presupposes the use of a hot water circulation system, which, based on the heating quantity to be transferred, is relatively heavy. When using the specifically, substantially more light-weight heat transfer pipe, hose conduits cannot be used since, due to their flexibility, they are neither dimensionally resistant against external excess pressure, nor are such hoses absolutely vacuum tight.

The advantage of a heat transfer in accordance with a heat pipe principle is precisely that this type of heat transfer is substantially easier with the heat transfer efficiency or output being the same. However, a heat transfer system operable in accordance with the heat pipe principle poses stringent requirements regarding cleanliness, tightness against excess pressure and vacuum, and, with respect to accuracy of metering the heat transfer medium to be introduced as well as with regard to safety measures against interruption in the capillary structure for the return of the condensate. Due to these stringent requirements, heat pipes are manufactured in an entirely-metallic design as a finished module ready for operation. In case of relatively long heat transfer paths, especially transfer paths which must bridge movable zones, such a sealed and finished module is unsuitable due to the lack of mobility and difficulty in mounting.

In commonly-assigned U.S. application Ser. No. 56,234, filed July 10, 1979, (corresponding to German Application P 28 34 838.1) and entitled "Heat Transfer System", the disclosure of which is incorporated herein to the extent necessary in understanding the present invention, the heat transfer system for transferring heat between a heat-emitting zone and a heat-consuming zone in accordance with the heat pipe principle with limited relative movement taking place between the heat source and the heat sink, which heat transfer system includes a bundle of capillaries extending essentially in parallel to one another and movable relatively to one another with the bundle of capillaries being arranged at least along a partial zone of the heat transfer path between both the heat source and the heat sink with each individual capillary of the bundle being fashioned in accordance with the heat pipe principle.

By virtue of the subdivision of the heat transfer pipe into a bundle of parallel-extending capillaries, each of which are individually movable, in accordance with the aforementioned U.S. application, the required mobility of the heat transfer system is attained and the vacuum tightness is also likewise ensured.

The aim underlying the present invention essentially resides in providing a heat transfer system which, with the use of a heat transfer in accordance with the heat pipe principle, is capable of bridging even movable zones and by which it is possible to assemble the heat transfer system, when installed in a rather large unit, of several individual components into a finished heat transfer system.

In accordance with advantageous features of the present invention, a threadly-connected, vacuum-tight hose conduit resistance against the heat transfer medium with an internal capillary structure for a return of the condensate is arranged between the heat-emitting zone or heat source and the heat-consuming zone or heat sink.

By virtue of the utilization of the hose section, it is possible for the heat transfer system to bridge movable zones. Additionally, by virtue of the threaded connection of the hose section, the heat transfer system can be assembled from its individual components during installation.

In accordance with a further advantageous feature of the present invention, a hermetically-sealable opening is provided for the filling and/or venting of the heat transfer system with sealable opening being provided in a zone of the heat source and/or of the heat sink. By virtue of the provision of the hermetically-sealable openings, preferably in the zone of the heat source and-/or in the zone of the heat sink, after the heat transfer system has been completely mounted, the heat transfer system can readily be filled and vented.

To facilitate the sealing or venting of the heat transfer system, the hermetically-sealable opening may be sealed by a pointed screw. However, the opening may also be sealed by pinching off and/or melting of a capillary sealingly arranged at the sealable opening.

A supporting coil spring may, in accordance with the present invention, be arranged in the interior of the hose conduit with the spring being in contact with an inner wall thereof.

Moreover, the interior of the hose conduit may be provided with a groove structure which extends in the longitudinal direction of the hose. Furthermore, the hose conduit may also at least partially include a heat-insulating material.

By virtue of the above-noted features of the present invention, a heat transfer system is provided which can subsequently be assembled from its individual parts, filled, and vented during the installation of the heat transfer system into a large unit such as, for example, a vehicle. Moreover, the movable zones within the heat transfer path can readily be bridged by means of the hose conduit. Due to the heat-insulating effect of the hose conduit, radiation losses during heat transfer are lower than the case of a heat transfer system of a metallic construction.

Accordingly, it is an object of the present invention to provide a heat transfer system for transferring heat between a heat source and a heat sink which avoids, by simple means, shortcomings and disadvantages encountered in the prior art.

Another object of the present invention resides in providing a heat transfer system for transferring heat between a heat source and a heat sink which is readily adaptable to situations wherein there is relative movement between the heat source and the heat sink.

A further object of the present invention resides in providing a heat transfer system for transferring heat between a heat-emitting zone and a heat-consuming zone which system operates in accordance with the heat pipe principle.

A still further object of the present invention resides in providing a heat transfer system which can readily be assembled from individual parts, filled, and vented during the installation of the heat transfer system into a larger unit.

A further object of the present invention resides in providing a heat transfer system by which the radiation losses during a heat transfer are considerably lower than prior art heat transfer systems.

A still further object of the present invention resides in providing a heat transfer system which is simple in construction and therefore relatively inexpensive to manufacture.

These and other objects, features, and advantages of the present invention will become more apparent from the following description when taken in connection with the accompanying drawings, which show, for the purposes of illustration only, two embodiments in accordance with the present invention, and wherein.

Figure 1:
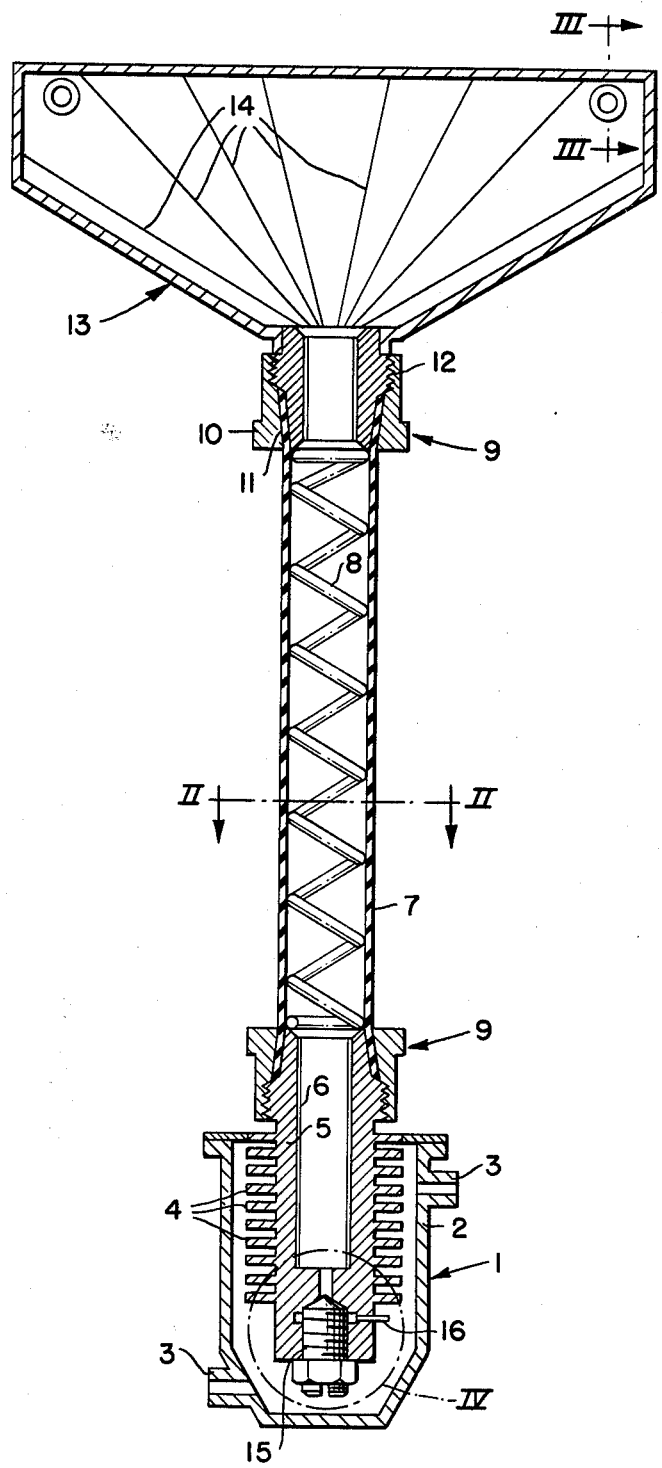
FIG. 1 is a partially—schematic longitudinal, cross-sectional view through a heat transfer system in accordance with the present invention.

Referring now to the drawings wherein like reference numerals are used throughout the various views to designate like parts, and, more particularly, to FIG. 1, according to this figure, a heat exchanger generally designated by the reference numeral 1 includes an externally-sealed hot water tank 2 and hot water connections 3 with a heat source 5 of the heat transfer system, provided with the heat transfer ribs, being arranged in the hot water tank 2. A bore is provided in the interior of the heat source with the bore being provided with an internal groove structure 6 to which heat is supplied from the exterior thereof.

A hose conduit 7 is attached with a hermetic sealing action at the heat source 5 by means of a threaded mounting generally designated by the reference numeral 9. The hose conduit 7 establishes a communication between the heat source 5 and a flat heating element generally designated by the reference numeral 13 which heating element 13 serves as a heat sink where the heat to be transferred is transmitted. The hose conduit 7 is sealingly connected with the flat heating element by means of the threaded mounting 19.

In the embodiment shown in FIG. 1, a supporting coil spring 8 is arranged in the interior of the hose conduit with the spring 8 contacting the inner wall of the hose conduit 7 for the purpose of supporting the hose conduit 7 against external excess pressure and providing a certain capillary structure for the return of the condensate.

One sleeve nut 10 with a sealing cone 11 and thread 12 is provided at the threaded mountings 9. The sleeve nut 10 urge the hose conduit 7 with hermetically tight sealing action against a corresponding inner sealing cone provided at the heat source and/or heat sink and hold the conduit 7 in position.

The hose conduit 7 is fashioned, at least on its outside, of a heat insulating material; whereas, the hose conduit 7 must be resistant, on the inside thereof, against the introduced heat transfer medium such as, for example, ammonia or alcohol. The wall of the hose conduit 7 must be absolutely vacuum tight over rather long periods of time and the same holds true as well for the threaded mountings 9.

Figure 4:
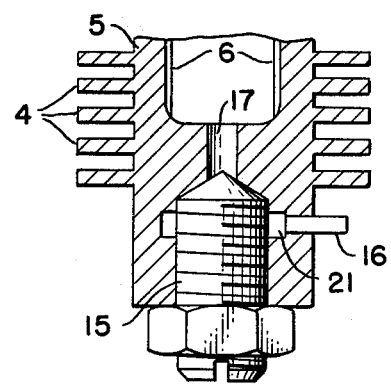
FIG. 4 is an enlarged detailed view taken in the area of the dot-dash circle designated IV in FIG. 1.

As shown in FIG. 4, an opening 17 is provided on an underside of the heat source. The opening 17 may be hermetically sealed by a pointed sealing screw 15 which may be secured in a sealed condition by means of a counternut 15'. By the introduction of a curable or permanently-elasting sealing compound into the sealing gap, an even better sealing result can be attained.

To facilitate the filling and evacuation of the interior of the heat transfer system, a capillary 16 is sealing mounted by, for example, soldering, forwardly of the opening 17 to a peripheral groove 21 provided in the threaded area accommodating the sealing screw 15. The capillary 16 is provided whereby a device for introducing the heat transfer medium and a vacuum pump can readily be connected to the heat transfer system.

In the event the capillary 16 is constructed so as to have a longer length, an excess in the length can be would around the lower cylindrical portion of the heat source and the sealing screw 15 can be entirely omitted. The capillary after evacuation with the vacuum pump still being attached, can then be pinched off and melted at the pinching off point. When the heat transfer system is remounted, the sealing point of the capillary can be cut off and the system can again be filled and vented or exhausted.

Figure 3:
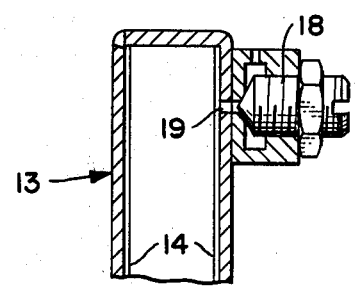
FIG. 3 is an enlarged detailed view of the heat transfer system of FIG. 1 taken in the area of the section line III—III.

As shown in FIG. 3, an opening 19 may be arranged at the flat heating element 13 with the opening 19 being adapted to be sealed by means of a pointed sealing screw 18. The flat heating element 13 is provided with a ray-shaped groove structure 14 which extends to the junction point of the hose conduit 7. The sealing point 13 for the opening 19 can likewise be hermetically closed off by the use of special sealing compounds.

Figure 2A:
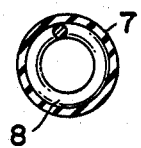
FIG. 2a is a cross-sectional view taken along the line II—II in FIG. 1 of a first embodiment of a hose conduit of the heat transfer system in accordance with the present invention.
Figure 2B:
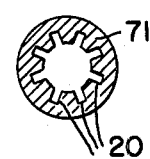
FIG. 2b is a cross-sectional view taken along the line II—II of FIG. 1 of a second embodiment of a hose conduit of the heat transfer system in accordance with the present invention.

FIG. 2a provides an example of the cross section through a first embodiment of the hose conduit of the present invention with FIG. 2b providing an example of a further embodiment wherein a hose conduit 7' includes a groove structure 20 arranged interiorly of the hose conduit 7'. Due to the larger wall thickness of the hose conduit 7', it may be possible to dispense with the provision of the supporting coil spring 8.

While I have shown and described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are emcompassed by the scope of the appended claims.

I claim:

1. A heat transfer system for transferring heat between a heat-emitting means and a heat-consuming means in accordance with a heat pipe principle, characterized in that a vacuum-tight hose conduit means is arranged between the heat-emitting means and the heat-transfer means for communicating the respective means with each other, a longitudinally-extending groove structure is disposed interiorly of the hose conduit means for supporting the hose conduit means against excessive external pressure and for providing an internal capillary structure, and in that a threaded connection means is provided for connecting respective ends of the hose conduit means into a heat transfer path.

2. A heat transfer system according to claim 1, characterized in that the hose conduit means is fashioned of a material resistant to a heat transfer medium of the heat transfer system.

3. A heat transfer system according to claim 1, characterized in that a hermetically-sealable opening is provided for one of filling and venting of the heat transfer system, the hermetically-sealable opening is arranged in an area of one of the heat-emitting means and heat-consuming means.

4. A heat transfer system according to claim 3, characterized in that a pointed sealing means is provided for sealing the hermetically-sealable opening.

5. A heat transfer system according to claim 3, characterized in that a capillary means is arranged at the hermetically-sealable opening, and in that the sealable opening means is sealed by one of a pinching off and melting of the capillary means arranged at the sealable opening.

6. A heat transfer system according to one of claims 1, 2, 3, 4, or 5, characterized in that at least a portion of the hose conduit means is formed of a heat-insulating material.

* * * * *